United States Patent [19]
Umeda

[11] 3,979,772
[45] Sept. 7, 1976

[54] AUTOMATIC TAPE LOADING TYPE RECORDING AND/OR REPRODUCING APPARATUS

[75] Inventor: Hiroyuki Umeda, Yokohama, Japan

[73] Assignee: Victor Company of Japan, Limited, Yokohama, Japan

[22] Filed: Sept. 11, 1975

[21] Appl. No.: 612,332

Related U.S. Application Data

[63] Continuation of Ser. No. 441,306, Feb. 11, 1974, abandoned.

[30] Foreign Application Priority Data

| Feb. 12, 1973 | Japan | 48-17171 |
| Feb. 12, 1973 | Japan | 48-17172 |
| Feb. 12, 1973 | Japan | 48-17173 |
| Feb. 14, 1973 | Japan | 48-17498 |
| Feb. 13, 1973 | Japan | 48-17621 |
| Feb. 15, 1973 | Japan | 48-18615 |
| Feb. 19, 1973 | Japan | 48-19945 |
| Feb. 15, 1973 | Japan | 48-19863[U] |

[52] U.S. Cl. ................................ 360/85; 360/95
[51] Int. Cl.² ................. G11B 23/04; G11B 15/66
[58] Field of Search ............... 360/85, 95, 71; 242/189, 195, 197–199, 55, 19 A; 226/90–94

[56] References Cited
UNITED STATES PATENTS

| 3,598,926 | 8/1971 | Umeda | 360/85 |
| 3,678,217 | 7/1972 | Kihara | 360/85 |
| 3,688,059 | 8/1972 | Miura et al. | 360/85 |
| 3,702,383 | 11/1972 | Inaga et al. | 360/85 |
| 3,735,053 | 5/1973 | Eibensteiner | 360/85 |
| 3,784,761 | 1/1974 | Moritan et al. | 360/85 |
| 3,788,571 | 1/1974 | Finster et al. | 360/95 |
| 3,792,491 | 2/1974 | Inaga | 360/85 |
| 3,800,314 | 3/1974 | Sato | 360/85 |
| 3,825,944 | 7/1974 | Terao et al. | 360/85 |

Primary Examiner—Alfred H. Eddleman

[57] ABSTRACT

The invention relates to a recording and/or reproducing apparatus an automatic tape loading type. A loading mechanism is moved to a position for drawing a tape out of a tape-accommodating casing structure, such as a cassette. The tape to wraps around a cylindrical tape guide structure and over a specific angular extent thereof. This guide structure has at least one transducer such as a rotating head, a single motor for driving the transducer, a capstan spindle, reel discs, and other parts. An eccentric is turned structure rotated by power transmitted from the motor during loading and unloading, thereby operating and controlling loading mechanism.

22 Claims, 14 Drawing Figures

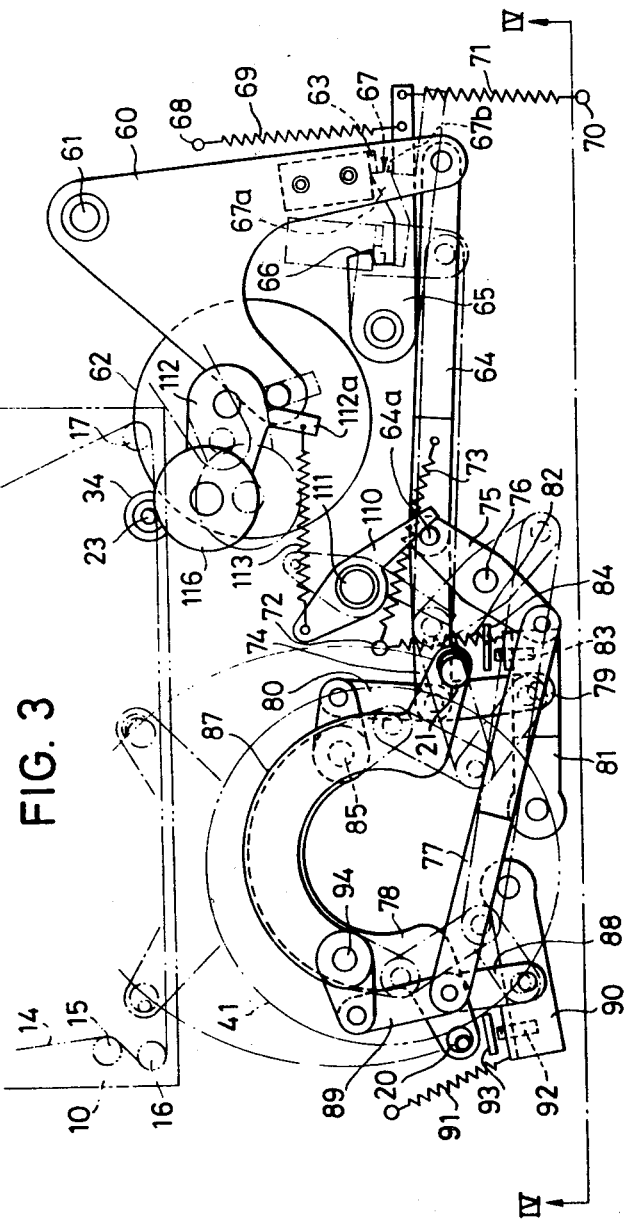
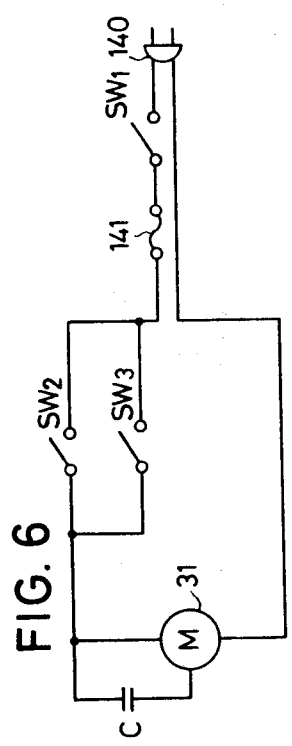
FIG. 3
FIG. 6

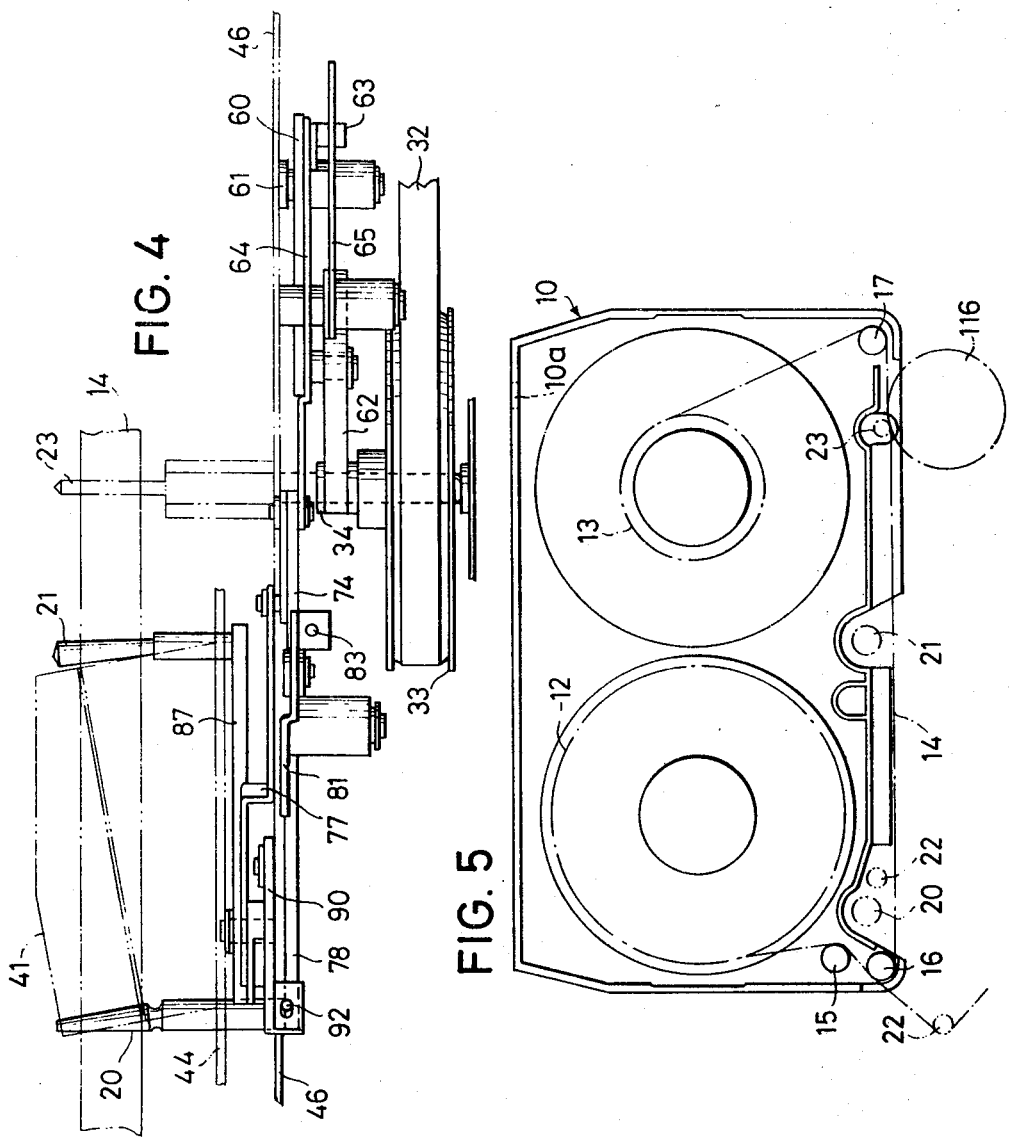

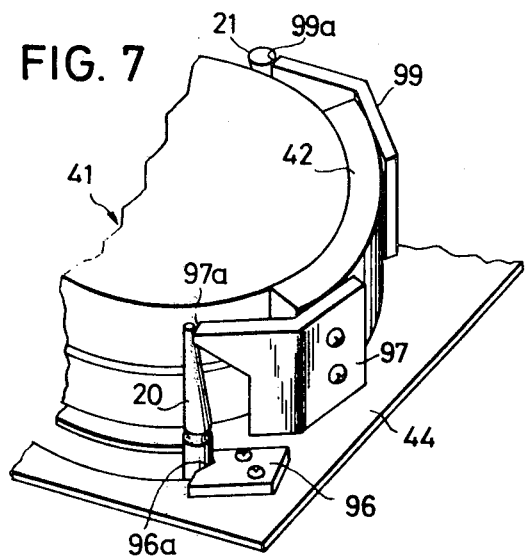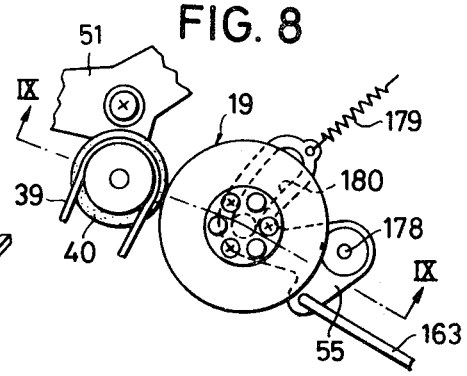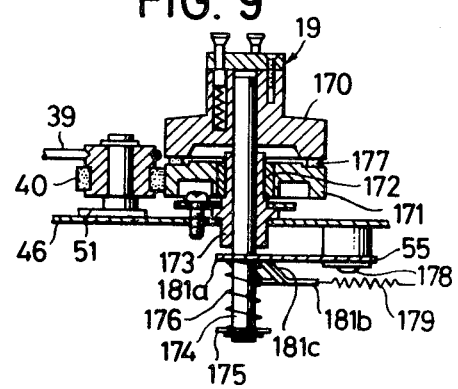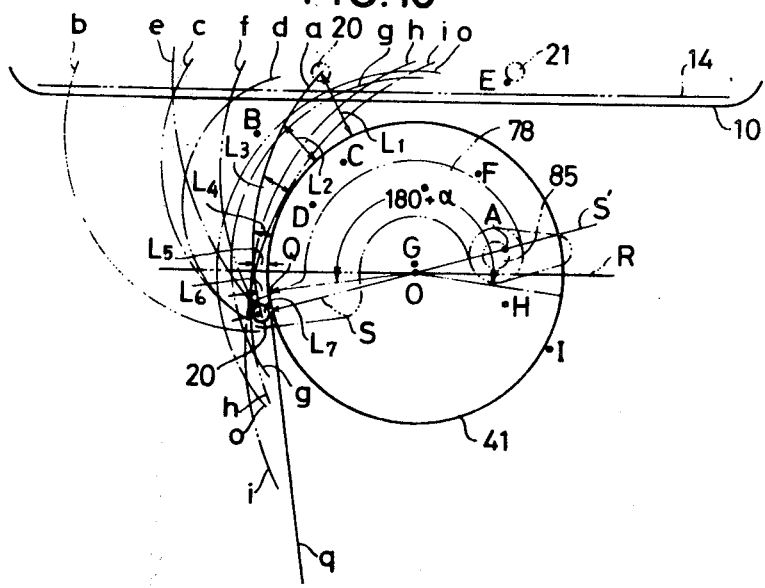

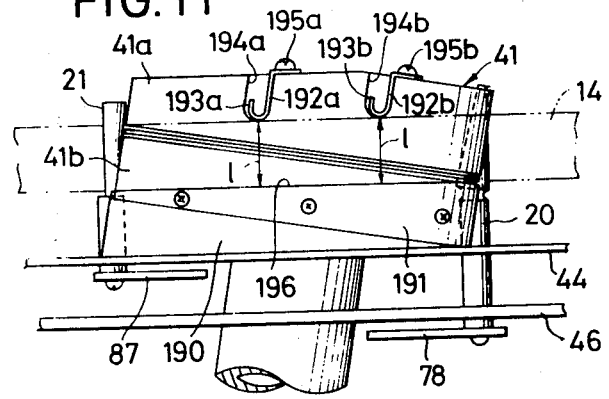
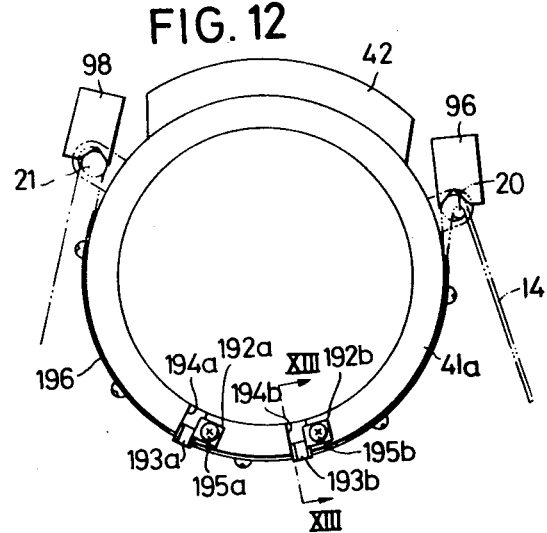
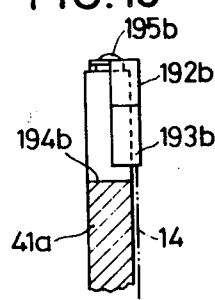
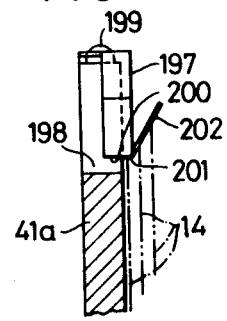

AUTOMATIC TAPE LOADING TYPE RECORDING AND/OR REPRODUCING APPARATUS

This is a continuation of application Ser. No. 441,306, filed Feb. 11, 1974, now abandoned.

BACKGROUND OF THE INVENTION

This invention relates generally to a recording and/or reproducing apparatus of the automatic tape loading type.

More particularly, an apparatus of the described type has a recording which is reeled out, drawn from a tape roll, and automatically loaded in a specific tape travel path. The means for drawing out and guiding of the tape during loading and unloading includes a single motive power source for turning a rotating head, a capstan, and the like. The mechanism has a simple construction and uses an eccentric rotating structure.

Known automatic tape loading type recording/reproducing apparatuses use a tape drawn out of a cassette and wrapped a guide drum, over a specific angular range thereof. In an apparatus of this character, sometimes a loading process is stopped while in progress at the time of recording/reproducing and an unloading operation is begun wherein the tape which has been drawn out of the cassette is returned into the original cassette. In this apparatus, furthermore, it is necessary to drive a rotating video head, a capstan, and reel discs at the time of the recording/reproducing operation.

In a conventional apparatus of this character, the rotating video head, capstan, and reel discs are driven and controlled by means of a single motor. However the means for drawing out and guiding the tape is driven by another motor used exclusively for loading. The second motor is used because the load apparatus is of a design such that it moves in a complicated manner through a relatively long distance, at the time of loading or unloading. For this reason, the apparatus has required at least two motors, which add to the total weight and the cost of the apparatus.

In addition, there is an apparatus wherein, when a control lever is moved, its movement is transmitted by way of a cam to cause a guide drum, a fixed head, a pinch roller, and other parts which move thereby to cause a magnetic tape to wrappingly contact the drum, in a relative manner. While a motor is not necessary exclusively for loading in this apparatus, this apparatus is deficient in its controllability and it tends to become complicated in organization.

SUMMARY OF THE INVENTION

Accordingly, it is a general object of the present invention to provide a new and useful automatic tape loading type recording/reproducing apparatus in which the above described problems have been solved.

A specific object of the invention is to provide an automatic tape loading recording/reproducing apparatus wherein loading means comprising toggle joints, loading arms, and other parts which use the movement of a rotational center having an eccentric structure which is rotated by the pressing and separation of a rotating part driven by a main motor. In the apparatus according to the present invention, the loading means also can be driven by the driving power source for driving the capstan, reel discs, and other moving parts.

Another object of the invention is to provide an automatic tape loading type recording/reproducing apparatus in which the loading means is moved to the operative position by the first one half revolution of the above mentioned eccentric rotating structure. Further the loading means is moved to the original unoperated position by the succeeding one half revolution of the eccentric rotating structure for carrying out an unloading operation.

Another object of the invention is to provide an automatic tape loading type recording/reproducing apparatus in which means are provided to press a pinch roller against the capstan interrelatedly with the rotation of the above mentioned eccentric rotating structure, at the time of loading. By this provision, a driving power source, such as a solenoid, is not required to actuate the pinch roller and related mechanism, whereby the apparatus can be made small, and the power consumption can be reduced.

Another object of the invention is to provide an automatic tape loading type recording/reproducing apparatus in which a tension servomechanism is changed over gradually to its operated state, interrelatedly with the loading operation. By this provision, excessive tension can be prevented from being applied to the tape drawn out of the tape accommodating casing structure at the time of loading operation, whereby the tape can be protected from breakage and damage.

Still another object of the invention is to provide an automatic tape loading type recording/reproducing apparatus in which, upon completion of the unloading operation, the power supply circuit of the above mentioned main motor is opened, thereby to change over the main motor to an inoperated state.

A further object of the invention is to provide an automatic tape loading type recording/reproducing apparatus in which a drive roller presses against a reel disc. This roller imparts a driving power in the tape winding direction, in a high-speed travel. This roller is held pressed against the reel disc also at the time of stopping mode. At the time of the unloading, the drive roller is driven to restore the tape into the tape accommodating casing structure. The drive roller is stopped, at the time the rotational load torque of the drive roller is utilized to impart a braking force to the reel disc. By this provision, the tape take-up operation during unloading and stopping of the reel discs can be doubly carried out by the means for driving the tape in high-speed travel. The construction of the reel disc driving mechanism is simplified.

A further object of the invention is to provide an automatic tape loading type recording/reproducing apparatus adapted to drive the tape at high speed, during unloading operation. The operation can be changed over directly from the recording/reproducing mode to the fast-forwarding and/or rewinding mode. By this provision, at the time of changing over from the recording/reproducing mode to the fast-forwarding and/or rewinding mode, the stopping control manipulation is not carried out. Further, there is no necessity of waiting for the completion of the unloading operation accompanying the stopping control. For this reason, the controllability is improved. Moreover, the desired fast-forwarding and/or rewinding operation can be carried out in a relatively short time.

A further object of the invention is to provide an automatic tape loading type recording/reproducing apparatus in which, at the time of loading operation, the tape drawing and guiding means for engaging the tape and drawing the same out of the tape accommodating casing structure moves in a gradual manner to approach the guide drum and to be in a position of closest proximity to the guide drum upon completion of the loading operation.

A further object of the invention is to provide an automatic tape loading type recording/reproducing apparatus so adapted that the tape drawing and guiding means is positionally controlled at the loading completion position when it is subjected to a force urging it toward the loading operation direction.

A still further object of the invention is to provide an automatic tape loading type recording/reproducing apparatus in which the tape drawing and guiding means are held in the loading completion position. This means includes loading poles fixed at their base parts to a loading arm to engage the tape simultaneously at two points.

An additional object of the invention is to provide an automatic tape loading type recording/reproducing apparatus so adapted that there is a relatively small angle of movement of the tape drawing and guiding means at the time of loading operation. By this provision, the time required for the loading and unloading operations can be shortened. At the same time, a shorter length of the tape can be drawn out of the tape accommodating casing structure. Moreover, the tape loop outside of the casing structure can be a loop of simple shape.

Other objects and further features of the present invention will be apparent from the following detailed description when read in conjunction with the accompanying drawings.

BRIEF DESCRIPTION OF THE DRAWINGS

In the drawings:

FIG. 3 is a partial plan view showing the loading mechanism of the apparatus illustrated in FIGS. 1 and 2;

FIG. 4 is a front elevation, with a part cut away, of the mechanism shown in FIG. 3 as viewed from the line IV—IV in the arrow direction;

FIG. 5 is a plan view showing one example of a cassette suitable for use in the apparatus illustrated in FIGS. 1 and 2, the upper cover of the cassette being removed;

FIG. 6 is a circuit diagram of one embodiment of the power supply circuit of a motor used in the apparatus shown in FIG. 1;

FIG. 7 is a fragmentary perspective view showing one embodiment of a mechanism for engaging poles for loading, the poles being positioned at the loading completion positions in the apparatus illustrated in FIGS. 1 and 2;

FIG. 8 is a partial plan view, with parts removed, showing the take-up reel disc and related parts in the apparatus illustrated in FIG. 2;

FIG. 9 is a section taken along the line IX—IX in FIG. 8 as viewed in the arrow direction;

FIG. 10 is a diagram indicating the movements of poles for loading accompanying loading and unloading operations in the apparatus illustrated in FIGS. 1 and 2;

FIG. 11 is a partial front elevation view showing one embodiment of a tape guide device used at the peripheral surface of the guide drum of the apparatus shown in FIGS. 1 and 2;

FIG. 12 is a plan view of the device shown in FIG. 11;

FIG. 13 is a partial enlarged section taken along the line XIII—XIII in FIG. 12 as viewed in the arrow direction; and FIG. 14 is a partial enlarged section similar to FIG. 13, showing another embodiment of the parts shown therein.

DETAILED DESCRIPTION

Figure 1:
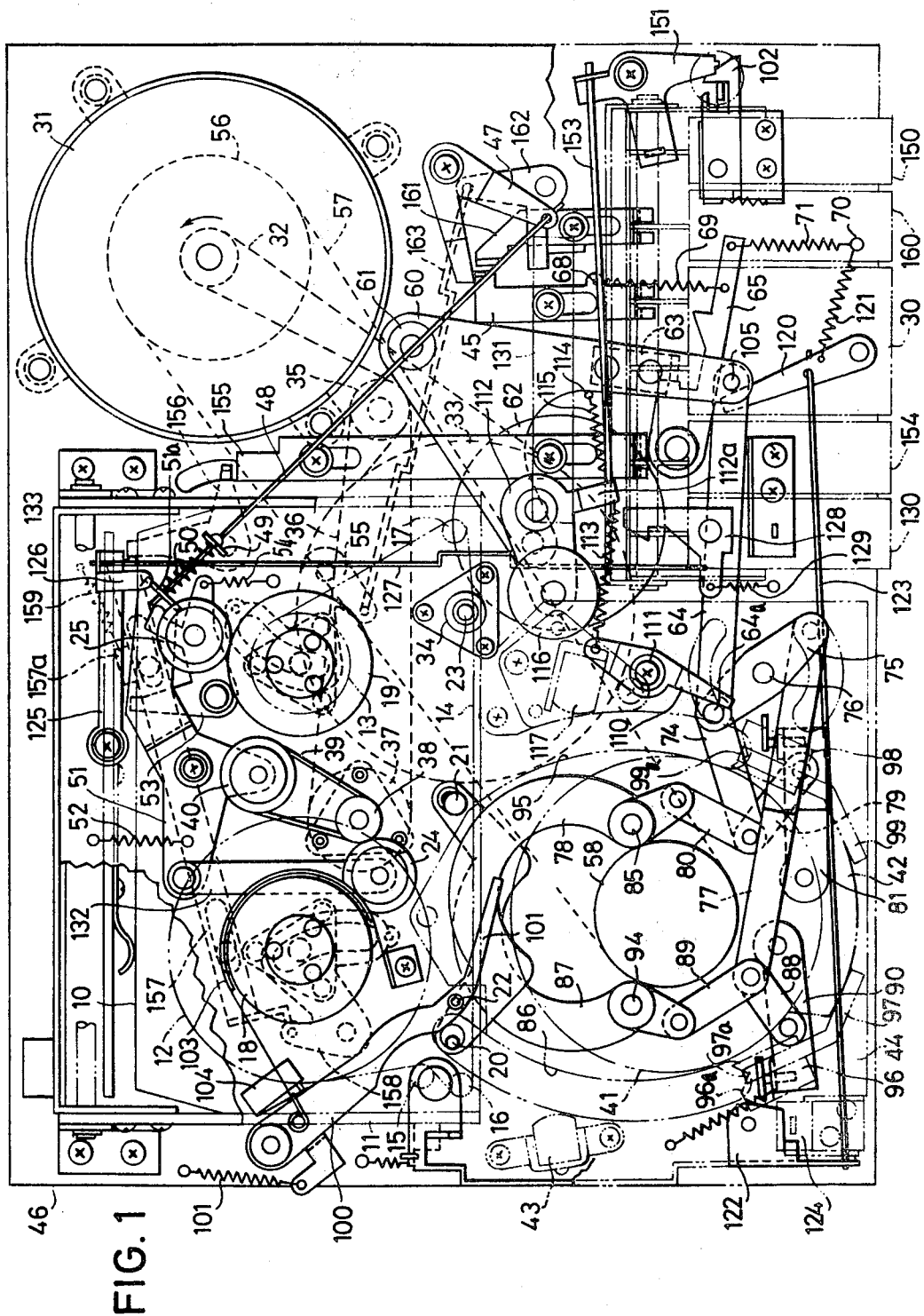
FIG. 1 is a plan view, with parts cut away, showing one embodiment of an automatic tape loading type recording/reproducing apparatus according to the present invention, in a state prior to loading of a recording tape.

In FIGS. 1 and 5, a cassette 10 is inserted into a pop-up type cassette housing 11 of an automatic tape loading type recording/reproducing apparatus. The cassette 10 is loaded into a specific position by being locked in a pressed down position, as indicated in FIG. 1. The cassette 10 has a construction as shown in FIG. 5 and contains therein a supply tape roll 12 and a take-up tape roll 13. The magnetic tape 14 from the supply tape roll 12 is guided by guide poles 15 and 16 to be paid out of the cassette 10. After passing by the front face of the cassette, the tape again enters the cassette, within which the tape is guided by a guide pole 17 to reach the take-up tape roll 13.

In the above described loaded state, the supply and take-up reels are respectively coupled to the supply reel disc 18 and the take-up reel disc 19. Furthermore, a pair of loading poles 20 and 21, a tension pole 22, and a capstan 23 are respectively inserted relatively into a cutout in the cassette 10 and are positioned on the inner side of a tape loop.

When the apparatus is in the stopped mode indicated in FIG. 1, the supply reel disc 18 is subjected to a braking force due to the load of a rotation transmitting mechanism of a rewinding roller 24 pressed against the supply reel disc. The take-up reel disc 19 is subjected to a braking force due to a braking member 25 pressed thereagainst.

Next to be described in the operation of the apparatus when the tape 14 within the cassette 10 is drawn out loaded in a prescribed path of travel. The apparatus is changed over to the reproducing (playing) mode as follows. To initiate playing a button 30 is pressed downwardly to its lock position, and a microswitch ($SW_2$ in FIG. 6) is closed to start a motor 31. The resulting counterclockwise rotation of the rotor shaft of this motor 31 is transmitted through an endless belt 32 to rotate a flywheel 33 in the counterclockwise direction. The capstan 23, with a drive roller 34 at its base part, is rotated unitarily with the flywheel 33. Furthermore, an intermediate pulley 35 is rotated clockwise as it is pressed against the belt 32 from the outer side. This rotation is transmitted by way of an endless belt 36 to rotate clockwise a pulley 37 and a drive pulley 38 formed integrally therewith. The rotation of the pulley 38 is transmitted by way of an endless belt 39 to rotate a drive roller 40 in the clockwise direction.

The motor 31 also drives at high speed a rotating video head (not shown) which is disposed so that its head surface faces out at the peripheral surface of a guide drum 41. This guide drum 41 comprises upper and lower guide drums spaced apart by a small gap distance and held by a supporting member 42. The rotating video head (not shown) is rotatably held in the gap. As shown in FIG. 4, this guide drum 41 is provided on a sub-chassis 44 with an inclination such that the part thereof confronting an erasing head 43 is at the low part.

As another result of the pressing of push button 30, a sliding lever 45 slides upwardly as viewed in FIG. 1, along a part of the chassis 46. The V-shaped rotating lever 47 rotates clockwise to the position indicated in FIG. 2, one arm thereof being engaged by the sliding lever 45. Consequently, a rod 48 fixed at one end to the lever 47 moves upwardly with leftward inclination, as viewed in FIG. 2, together with an engagement part 49, and the tension of a coil spring 50 increases. At the same time, a substantially Y-shaped lever 51 is rotated in the counterclockwise direction against the tensile force of a spring 52. A brake lever 53 is rotated in the counterclockwise direction against the force of spring 54, a projecting part 53a of this brake lever being engaged by a bent part 51a of the lever 51.

Figure 2:
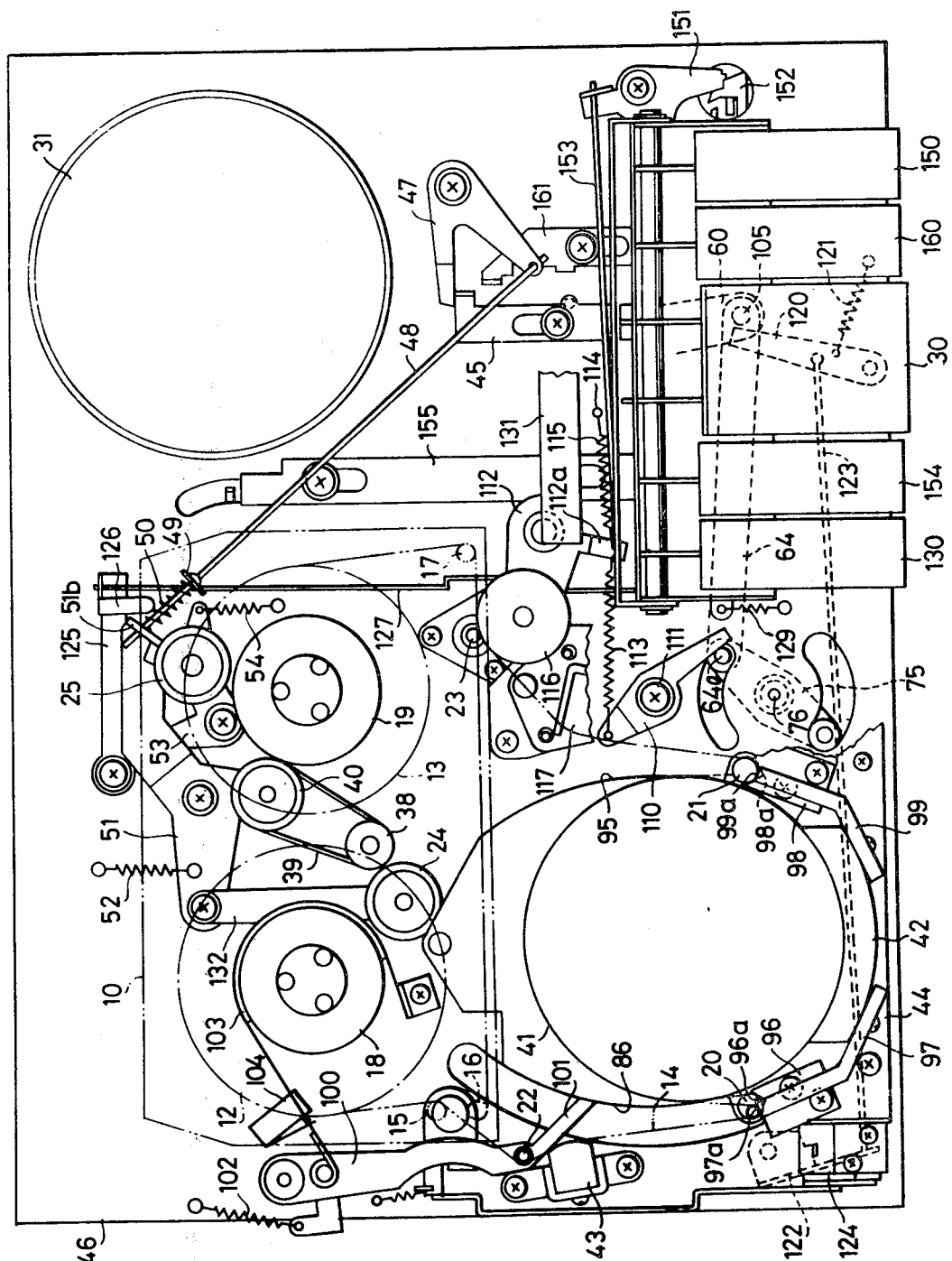
FIG. 2 is a plan view, with parts removed, showing the apparatus illustrated in FIG. 1 in the state after loading of the recording tape.

As a result of the above mentioned rotations of the lever 51 and the brake lever 53, the reel disc drive mechanism assumes the state indicated in FIG. 2. As for the supply reel disc 18, the pressure of the roller 24 is removed, and the braking force is no longer applied. As for the take-up reel disc 19, the pressure due to the brake member 25 is removed. As a result of the pressure of the drive roller 40 rotating clockwise, the braking force is removed. At the same time, a torque is imparted in the tape take-up direction to the take-up reel disc. The torque transmitted at this time to the upper disc is controlled by a lever of substantially Z-shape and is thus limited to a relatively low value, as described hereinafter.

A loading mechanism constituting an essential part of the present invention in the stopped mode will now be described. A V-shaped starting lever 60 is pivotally supported on a shaft 61 on the lower side of the chassis 46. Lever 60 rotatably holds at the outer end of its shorter arm an eccentric roller 62. An engagement member 63 is fixed to its longer arm. Furthermore, the outer end of this longer arm of the starting lever 60 rotatably supports one end of a connector 64, by a shaft 105. An engagement lever 65 is provided with a first engagement part 66 and a second engagement part 67 at positions which confront the engagement member 63. A spring 69 is stretched between this lever 65 and a pin 68 fixed to the aforementioned sliding lever 45. A spring 71 is stretched between this lever 65 and a pin 70 fixed to the chassis 46. This part of the mechanism is so designed that, when the sliding lever 45 is in its unoperative state, the tensile force of the spring 71 is greater than that of the spring 69. The engagement lever 65 is at a position to which it has rotated clockwise.

A torque in the clockwise direction is imparted by the tensile force of a spring 73 stretched between the connector 64 and a pin 72 fixed to the chassis 46 to the starting lever 60. This lever is limited in rotation at an angular position (indicated by a single-dot chain line in FIG. 3) at which the engagement member 63 contacts and is stopped by the first engagement part 66 of the engagement lever 65. With the mechanism in this state, the eccentric roller 62 is at an angular position at which its part of minimum diameter is facing (but is spaced apart from) the drive roller 34. The other end part of the connector 64 is connected by a pin 64a to ends of a lever 74 and a rotating lever 75. The rotating lever 75 is rotatably supported on a shaft 76 and supports, rotatably, a lever 77 at its other end.

The rotating mechanisms comprising a pair of loading arms 78 and 87 of curved shape will now be described, beginning with that of the first loading arm 78. The other end of the lever 74 is connected to the rotatable coupling part, between ends of levers 79 and 80. The other end of the lever 79 is rotatably supported to a rotating lever 81. The other end of the lever 80 is rotatably supported to one end of the arm 78. Although the rotating lever 81 is under a considerably large tension, imparting a clockwise torque thereto by a spring 82, it is limited from rotating further at a position fixed by a set screw 82, which is screwed into a bent part, at its tip, where it is abuttingly contacting an engagement member 84 fixed to the chassis 46.

The levers 74, 79, and 80 constitute a first toggle joint (force multiplication device). The levers 79 and 80 are mutually bent as shown in FIG. 1. The curved loading arm 78 is rotated clockwise with respect to a shaft 85. The guide pole 20, for loading is fixed to the outer end of the arm 78. Pole 20 has a base part of the shape of a cylindrical column and an end part having the shape of an inclined cone; and, passing through an arcuate guide slot 86 formed in the chassis, fits into the cassette 10.

Next, the rotating mechanism of the second loading arm 87 will be described. The other end of the lever 77 is connected to the rotatable coupling part between ends of levers 88 and 89. The other end of the lever 88 is rotatably supported on a rotating lever 90, while the other end of the lever 89 is rotatably supported to one end of the arm 87. The rotating lever 90 is under a large tension of a spring 91, imparting a clockwise torque thereto, but it is limited from rotating further at a position fixed by a set screw 92 screwed into a bent part at its tip, where it is abuttingly contacting an engagement member 93 fixed to the chassis.

The levers 77, 88, and 89 constitute a second toggle joint. The levers 88 and 89 are mutually bent, and the curved loading arm 87 is rotated counterclockwise with respect to a shaft 94. The guide pole 21 for loading is fixed to the outer end of the arm 87. It has a base part of the shape of a cylindrical column and an end part having the shape of an inclined inverted cone, and passes through an arcuate guide slot 95 formed in the chassis. It there fits into the cassette 10.

The operations of the loading mechanism and the arm rotation mechanisms of the above described arrangement and the various operations related to the loading operation are as follows.

When the apparatus is in the stopped mode as indicated in FIG. 1, the button 30 is pushed down as mentioned before, and the sliding lever 45 slides. The tension of the spring 69 thereupon increases and becomes greater than the tension of the spring 71. The engagement lever 65 is rotated counterclockwise to the position indicated by full line in FIG. 3. As a consequence, the first engagement part 66 of the engagement member 63 is released from its engaged state. The starting lever 60 is rotated clockwise responsive to the force of the spring 73. The short radius part of the eccentric roller 62 thereby presses against the drive roller 34, rotating in the counterclockwise direction.

Consequently, the eccentric roller 62 rotates clockwise at a relatively low speed. The radius of this roller 62, at its part pressing against the drive roller 34 gradually increases. In accordance with the rotation of this roller 62, the center of rotation thereof successively separates from the driver roller 34, whereby the starting lever 60 turns gradually in the counterclockwise direction, against the force of the spring 73. When the eccentric roller 62 rotates through approximately one half revolution, it assumes a state wherein its long radius part presses against the drive roller 34. The starting lever 60 is turned counterclockwise to the extreme position indicated by the full line in FIG. 3. Furthermore, during the above described rotation of the starting lever 60, the engagement lever 65 is turned clockwise against the force of the spring 69. The inclined surface 67a of the second engagement part 67 is engaged by the engagement member 63.

When the starting lever 60 rotates to the above stated position, the engagement lever 65 is turned counterclockwise by the spring 69. The inclined surface 67a of the second engagement part 67 is released from its engagement by the engagement member 63, and assumes a state of positive engagement of the engagement member 63 by the engagement surface 67b. As a result, although the starting lever 60 is under a torque due to the spring 73 urging it to turn in the clockwise direction, it assumes a state wherein it is limited in clockwise rotation, at the above mentioned maximum rotation position. The engagement member 63 is locked by the second engagement part 67.

In the eccentric roller driving mechanism at this time, the eccentric roller 62 assumes a state wherein, at a position in the vicinity of its maximum radius part, it is separated very slightly from the drive roller 34. Thereafter, it is rotated independently at a predetermined speed, without being subjected to a load related to the above mentioned loading operation.

As a result of the above described rotation of the starting lever 60, the connector 64 is moved toward the right from its position shown in FIG. 1 (indicated by single-dot chain line in FIG. 3). The shaft 64a is guided by a slot in the chassis. The lever 74 is similarly moved toward the right. The rotating lever 75 is turned clockwise.

The above mentioned movement of the lever 74 causes a gradual widening of the bend angle between the levers 79 and 80 constituting a toggle joint mechanism. Torques are imparted in the clockwise and counterclockwise directions, respectively, to the rotating lever 81 and the loading arm 78. At this time, the rotating lever 81 is held in the above mentioned position by the spring 82. The arm 78 is gradually turned in the counterclockwise direction. The pole 20 for loading is moved along the guide slot 86 by the rotation of the arm 78. Then, when withdrawing from the cassette 10, the pole 20 catches the magnetic tape 14 and draws the same out of the cassette 10.

The arm 78, as shown in FIG. 7, is restricted in rotation at the position indicated in FIGS. 2 and 7 at which the pole 20 is engaged at its base part simultaneously by a cutout part 96a of an engagement member 96 fixed to the sub-chassis 44 and an engagement part 97a of an engagement member 97. On one hand, the starting lever 60 is further rotated slightly to the above mentioned rotational position. During this rotation, the arm 78 is restricted in rotation. As a consequence, the rotation lever 81 is rotated slightly in the clockwise direction against the force of the spring 82, and the set screw 83 separates from the engagement member 84. At this time, the levers 79 and 80 assume an almost straight-line state and are held in that state by the lever 74.

The above mentioned rotation of the starting lever 60 is transmitted by way of the rotating lever 75 to move the lever 77 leftward. As a result of this movement of the lever 77, the arm 87 for loading is rotated in the clockwise direction through the second toggle joint mechanism, as described above. The magnetic tape 14 is caught by the pole 21, and is drawn out of the cassette 10. The arm 87 is restricted in rotation at a position at which the pole 21 contacts simultaneously a cutout part 98a of an engagement member 98 fixed at its base part to the sub-chassis and an engagement part 99a of an engagement member 99 the end of which is secured at an adjusted position on the support structure 42. However, the starting lever 60 is further rotated slightly to the above mentioned lock position. During this operation the rotating lever 90 is rotated counterclockwise against the force of the spring 91. The set screw 92 separates from the engagement member 93. At this time, the levers 88 and 89 are in a substantially straight-line state.

Accordingly, when the starting lever 60 is turned to the above mentioned lock position, the first loading arm 78 is under a counterclockwise torque due to the force of the spring 82, transmitted by way of the levers 79 and 80. The guide pole 20 is subjected to a specific pressing force by the engagement members 96 and 97 (FIG. 7) respectively acting at the two lateral edge parts of the engaged tape 14, that is, at the base part and outer end part thereof. The second loading arm 87 is under a clockwise torque due to the force of the spring 91 transmitted through the levers 88 and 89. The guide pole 21 is subjected to a specific pressing force by the engagement members 98 and 99, respectively, acting at the base part and the outer end part thereof.

Therefore, although the poles 20 and 21 are subjected to a force acting in the unloading direction by the tape tension at the time of tape travel, they are held positively and accurately at the loading completion position without the use of any locking mechanism. Moreover, they are prevented from vibrating as a result of fluctuation in the tape tension at the time of tape travel.

The forces pressing the pole 20 against the engagement members 96 and 97 and the pole 21 against the engagement members 98 and 99 are suitably set respectively by appropriately turning the set screws 83 and 92. These screws adjust the tensile forces of the springs 82 and 91 at the time of the above mentioned mode of operation.

The various actions related to the loading operation will now be described, beginning with that of a tension servomechanism. At the time of the above mentioned loading operation, the supply reel disc 18 is released from the braking force as mentioned hereinbefore. The magnetic tape 14 is drawn out from the supply tape roll 12. As a result of the movement of the pole 20 toward its actuation position accompanying the loading operation, the engagement point of the pole 20, for a supply tension lever 100, moves toward the outer end along a projecting engagement part 101. For this reason, the clockwise rotation of the tension lever 100 due to a spring 102, is carried out gradually. The tension servomechanism assumes an operational state wherein, at the instant when the loading means reaches a substantially intermediate point before the terminal position, the tension pole 22 engages the magnetic tape 14 drawn out from the tape roll 12. A brake band 103 tightens around the supply reel disc 18. The above mentioned rotation of the tension lever 100 causes a microswitch 104 (the switch SW₃ in FIG. 6) to close.

Accordingly, there is little possibility excessive tape tension will be imposed abruptly on the magnetic tape 14 paid out from the cassette 10. Damage to the tape 14 is prevented. The tension servomechanism is maintained in its unoperative mode during the initial period of the loading operation but is changed over to its operated mode in the latter period of the loading operation. For this reason, there is no pay out of excessive tape, which would otherwise occur if the loading operation is stopped prematurely. The rotational momentum of the tape roll 12 increases since upon completion of the loading operation, the tape roll 12 still continues to rotate because of momentum.

Next, a pinch roller pressing mechanism will be described. As the above mentioned loading operation progresses, a rotating lever 110 is engaged at one end part thereof by the shaft 64a. Lever 110 swings counterclockwise relative to the shaft 111. The force of spring 113 stretched between the lever 110 and a projecting part of a pinch roller support lever 112 increases. Consequently, the support lever 112 rotates clockwise, counter to the force of a spring 115 stretched between this lever 112 and a pin 114 fixed to the chassis. Thus, lever 112 moves to the operated position. A pinch roller 116 rotatably supported on the lever 112 is pressed against the capstan 23 with the magnetic tape 14 interposed therebetween, the capstan already rotating. Therefore, the tape 14 is clamped therebetween and driven in the forward direction. This pinch roller pressing mechanism is so adapted that the pinch roller 116 is pressed against the capstan 23 when the starting lever 60 has rotated through approximately one half of the angle of its terminal rotation.

Accordingly, there is no necessity of providing special driving means, such as a solenoid, for actuating the pinch roller in its pressing movement. Moreover, it is not necessary to provide timing means for accurately and positively interrelating the instant of pressing of the pinch roller and the instant of completion of the loading operation. Therefore, the structural organization of the apparatus can be simplified.

The above described mode of operation of the apparatus is indicated in FIG. 2. The magnetic tape 14 is loaded into a specific tape path, as indicated by the twodot chain line in FIG. 2. Then, the apparatus is changed over to the reproducing mode after elapsing the elapse of about 2 seconds after pressing down of play button.

At the time of completion of loading, that is, at the time of changeover to the reproducing mode, the magnetic tape 14 is drawn out of the cassette 10 from the supply tape roll 12 under the guidance of the guide poles 15 and 16. As the tape tension is maintained constant by the tension pole 22, the tape wraps the full-width erasing head 43 which erases the full tape width at the time of recording. The tape then wraps around a constant angular peripheral surface portion of the guide drum 41, as determined by the poles 20 and 21, for loading under the guidance of guide means as described hereinafter. Video signals are now recorded or reproduced by a rotating video head (not shown). The tape 14 then wrappingly contacts an audio/control head assembly 117, where recording/reproducing of audio and control signals is carried out. The tape is then clamped between and driven by the capstan 23 and the pinch roller 116. The tape 14 thus driven from this driving section is guided by the guide pole 17 to reenter the cassette 10 and is successively wound up on the take-up tape roll 13, which is being rotated in the tape take-up direction.

Furthermore, at the time of the above described loading operation, a detection lever 120 is engaged at its outer end by a shaft on the starting lever 60. Lever 120 is turned clockwise by a spring 121, as the lever 60 rotates counterclockwise. As a result of the turning of the detection lever 120, a lock lever 122 is actuated by way of a rod 123 and rotates counterclockwise up to its operative position. An ejection button 124 is thereby restricted in depressing movement.

When a cassette 10 is not inserted or when a pre-recorded cassette (with an opening 10a formed on its back face as indicated by the two-dot chain line in FIG. 5) is inserted into the housing 11 and locked in the depressed position, a detection lever 125 erasure is rotating clockwise for prevention of erroneous erasure, since projection on the back of the cassette is not detected. As a consequence, a lock lever 128, coupled by a rod 127 to the lever 125, is held in an operative position to which it has been turned counterclockwise by a spring 129. The manipulation of a push button 130 for recording is restricted, whereby a double recording on the pre-recorded magnetic type is prevented.

Next, the unloading operation for restoring the magnetic tape 14 into the cassette 10 will be described. When, at the time of the recording/producing mode, as indicated in FIG. 2, a push button 131 is pressed for stopping, the push button 130 for recording is released from its locked state, and it returns to its original position. The sliding rod 45 is returned to its original position. Consequently, levers 47, 51, and 53 are rotated respectively in directions opposite to the direction of operation at the time of loading. The tape drive control mechanism is changed over to the original state indicated in FIG. 1.

As for the take-up reel disc 19, the driving roller 40 separates therefrom, and the braking member 25 presses thereagainst. The tape winding torque is removed, and a braking force is applied. Furthermore, the roller 24 for rewinding is pressed against both the supply reel disc 18 and the drive pulley 38 being driven by the motor 31. The supply reel disc 18 is rotated clockwise. This supply reel disc 18 is thus rotated at a speed such that any slack in the tape 14, being drawn out of the cassette at the time the poles 20 and 21 are moved toward the unoperative positions, is positively taken up on the tape roll 12.

As another result of the movement of the sliding lever 45, the tension force in the spring 69 shown in FIG. 3 becomes weaker. The engagement lever 65 is rotated by the force of the spring 71 acting in the clockwise direction up to the position indicated by the single-dot chain line in FIG. 3. Consequently, the engagement piece 63 of the second engagement member 67 is released. The starting lever 60 is rotated slightly in the clockwise direction by the spring 73. The large-radius part of the eccentric roller 62 thereby presses against the driving roller 34. Consequently, the eccentric roller 62 is rotated further in the clockwise direction similarly as at the time of loading. The starting lever 60 is rotated gradually in the clockwise direction by the spring 73. When the eccentric roller 62 rotates through approximately one half revolution, the engagement piece 63 is engaged by the first engagement member 66. The starting lever 60 is limited from rotating further at the position indicated in FIG. 1.

As a result of the above described rotation of the starting lever 60, the various constituent members of the arm rotating mechanism respectively move in directions opposite to those at the time of loading. The loading arm 78 and the second loading arm 87, respectively, are rotated slowly in the clockwise and counterclockwise directions to their positions, as indicated in FIG. 1. At this time, the magnetic type 14 being drawn out of the cassette 10 is successively wound up on the supply tape roll 12 without slackening and is thus collected in the cassette 10.

Furthermore, as a result of the above described unloading operation, the tension lever 100 is engaged by the pole 20 for loading and rotated counterclockwise against the force of the spring 102. The tension pole 22 is rotated to the unoperative position at which it fits into the cassette. At this time, the microswitch 103 operates to stop the motor 31. A braking force is applied to the supply reel disc 19 in the same manner as described hereinbefore. On one hand, the pinch roller 116 stops pressing against the capstan 23.

Upon completion of the unloading operation, the lock lever 122 is at an unoperative position to which it has rotated clockwise. The locking action relative to the housing 11 is terminated by depressing the ejecting button 124. As a result, the housing 11 rotates together with the cassette 10 about an axis 133, whereby it becomes possible to detach the cassette 10.

Next, a circuit for controlling the operation of the motor 31 in relation to the manipulation for playing and to the loading and unloading operations will be described with reference to FIG. 6. In FIG. 6, a plug 140 is used to connect the circuit to a commercial power supply. When a main switch (not shown) of the apparatus is turned on, a power supply switch $SW_1$ of the circuit is closed. Then, when the push button 30 for playing is depressed, an operation switch $SW_2$ is closed. At this time, an AC current is applied by way of the switch $SW_1$, a fuse 141 for preventing excessive current, and the switch $SW_2$ to the motor 31, which thereupon starts. The loading operation is thus carried out as described above. Then, the recording/reproducing operation is carried out. As a result of the above described rotation of the tension lever 100 at the time of loading operation, a loading switch $SW_3$ is closed in parallel with the switch $SW_2$.

Furthermore, as mentioned above, when the push button 131 is depressed for stopping (at the time of recording/reproducing operation), the play push button 30 returns to its original position, and the switch $SW_2$ is opened. However, since the switch $SW_3$ is closed, the motor is still connected to its power supply and continues to rotate. Accordingly, the apparatus performs the aforedescribed unloading operation.

Upon completion of the unloading operation, the apparatus is changed over to the state indicated in FIG. 1. The tape 14 is now completely returned to and accommodated within the cassette. The tension lever 100 is moved to its original unoperative state, the switch $SW_3$ (the microswitch 104 in FIG. 1) is opened, and the motor 31 automatically stops.

Next, a control manipulation for instant stopping will be described. With the apparatus in the recording/reproducing mode indicated in FIG. 2, a push button 150 for instant stopping is depressed. A lever 151 of substantially T-shape rotates in the clockwise direction, and an end projecting part thereof is locked by a lock lever 152. The rotation of the lever 151 is transmitted by way of a rod 153 to rotate the pinch roller supporting lever 112 in the counterclockwise direction against the force of the spring 113. The pinch roller 116 separates from the capstan 23. The tape 14 is thereby released from its clamped and driven state and stops in the state wherein it is in loaded position, with a specific tape loop. When the push button 150 is depressed further, the lever 151 is released from its locked state due to the lock lever 152. The supporting lever 112 is rotated clockwise by the spring 113. Consequently, the pinch roller 116 is pressed against the capstan 23, and driving of the tape 14 is resumed.

Next to be described is the control manipulation for changing over the apparatus in the state indicated in FIG. 1 to the rewinding and fast forward modes and the resulting operation thereof. When a push button 154 for rewinding is depressed, a lever 155 for rewinding slides along the chassis 46. A substantially L-shaped lever 156 is engaged at a bent part thereof by lever 155 and rotated in the counterclockwise direction. Furthermore, a sliding lever 157 is engaged at one end thereof by the lever 156 and thereby caused to slide obliquely downward to the left against the force of a spring 159. As a result of this sliding movement of the lever 157, a substantially Z-shaped lever 158 is rotated counterclockwise. The pressing force between the upper and lower discs of the supply reel disc 18 is increased. The torque of the upper disc transmitted from the lower disc is increased similarly as in the case of the take-up reel disc 19 at the time of fast forward control manipulation described hereinafter. As another result of the above mentioned sliding movement of the sliding lever 157, the lever 53 is turned counterclockwise by engaging with the bent portion 157a. The reel disc 19 is released from the braking force due to the brake member 25.

As another result of the depressing of the rewinding button 154, the aforementioned operation switch $SW_2$ of the circuit shown in FIG. 6 is closed to start the motor 31. Consequently, the drive pulley 38 is rotated similarly as at the time of the recording/reproducing mode of operation. Furthermore, by way of the rewind roller 24 driven at the time of the above described unloading operation, the supply reel disc 18 is driven in the clockwise direction. As a result, the tape 14 accommodated within the cassette 10 is taken up on the supply tape roll 12 to which a relatively large winding torque is being applied. Rewinding is carried out at a high travel speed of the tape in the reverse direction.

When a push button 160 for fast forward (FIG. 1) is depressed, a fast-forward lever 161 slides upwardly as viewed in FIG. 1. The rotating lever 47 and a rotating lever 162 are both turned clockwise. This rotation of the lever 47 causes the reel driving mechanism to assume the state indicated in FIG. 2 as at the time of the aforedescribed loading operation. The drive roller 40 is pressed against the take-up reel disc 19. Furthermore, as a result of the rotation of the lever 162, the Z-shaped lever 55 is rotated in the clockwise direction through a rod 163. The pressing force between the upper and lower discs of the reel disc 19 is increased as described below. The torque transmitted from the lower disc to the upper disc increases.

As another result of the depressing of the fast-forward push button 160, the operation switch $SW_2$ of the circuit shown in FIG. 6 is closed, whereby the motor 31 is started. The resulting output of this motor is transmitted by way of the aforementioned power transmission mechanism to rotate the drive roller 40 in the clockwise direction. The reel disc 19 is driven in the counterclockwise direction. As a result, the tape 14 accommodated within the cassette is taken up on the take-up tape roll 13 to which a relatively large winding torque is being applied. Fast-forward operation is carried out, with the tape traveling at high speed in the forward direction.

Next to be described is the structural organization and operation FIGS. 8, 9 of a mechanism for changing the tape take-up torque applied to the tape roll at the time of fast-forward and rewind modes over to a torque value greater than the take-up torque at the time of recording/reproducing and unloading. FIGS. 8 and 9 show the take-up reel disc 19 and the driving mechanism thereof. Parts in these figures which are like parts in FIGS. 1 and 2 are designated by like reference numerals. The reel disc 19 comprises an upper disc 170 and a lower disc 171, as shown in FIG. 9. The lower disc 171 has a bushing 172 fitted onto a bearing member 173, such as an oil-less metal mounted on the chassis 46. Bushing 172 is prevented from being displaced downward, but is rotatably supported. The upper disc 170 is integrally fixed on a central spindle 174, which is rotatably journaled by the bearing member 173, whereby the upper disc 170 can rotate independently of the lower disc 171.

In addition, a coil spring 176 is interposed between a retaining flange 175 at the lower end of the spindle 174 and the aforementioned, substantially Z-shaped lever 55 fitted on the spindle 174. This spring 176 exerts an elastic force on the upper disc 170 urging it downwardly in the axial direction. The lower surface of the upper disc 170 is pressed against an annular friction member 177 bonded to the upper surface of the lower disc 171.

The substantially Z-shaped lever 55 is pivotally supported at a bent part thereof on a shaft 178 and is urged to rotate clockwise by a spring 179. It is rotated to the position indicated in FIG. 8, except at the time of the fast-forward mode. Furthermore, this lever 55 has an arm 181 which is provided with an arcuate slot 180 for engagement with the spindle 174. The arm 181 is bent stepwise and is formed with a high-position part 181a of the same height as the proximal part, a low-position part 181b, and an inclined part 181c interposed between and connecting these high-position and low-position parts.

At the time of the recording/reproducing mode, the upper disc 170 is pressed against the friction member 177 by the elastic force of the spring 176 compressed between the retaining flange 175 and the high-position part 181a of the lever 55. At this time, the spring force of the spring 176 is relatively small. The force with which the upper disc 170 is pressed against the friction member 177 is set at a low value. For this reason, a low level of torque is transmitted from the lower disc 171 driven by the drive roller 40 and through the friction member 177 to the upper disc 170.

When the aforedescribed fast-forward control manipulation is carried out, the lever 55 is turned counterclockwise against the force of the spring 179. The spring 176, guided at its upper end by the above mentioned inclined part 181c, is compressed and engaged by the low-position part 118b. As a consequence, the spring force of the spring 176 increases. The upper disc 170 is pressed with greater force against the friction material 177. Accordingly, driver roller 40 produces an increased torque transmitted by way of the friction member 177 from the lower disc 171 to the upper disc 170, at the same position as at the time of the recording/reproducing mode. The pressure surfaces of the friction member 177 and the upper disc 170 function as slip clutch surfaces at this time. Thus, an application of an excessively large tape tension on the tape 14 at the time of start of the fast-forward operation is prevented.

The mechanics relating to the take-up reel disc 19 of the above described construction will now be considered analytically. At the time of recording/reproducing mode and at the time of fast-forward mode, the rotational torque M (gr.-mm) derived from the upper disc 170 is representable by the following equation:

$$M = \frac{2}{3}\mu_k P \frac{(R2^3 - R1^3)}{(R2^2 - R1^2)} \quad (1)$$

$\mu_k$ is the coefficient of friction of the slip clutch part;
$P$ is the pressing force (gr.) of the slip clutch part;
$R1$ is the inner diameter (mm.) of the annular friction member 177; and
$R2$ is the outer diameter (mm.) of the member 177.

One example of specific numerical values for these parameters or variables in the Eq.(1) is as follows.
$\mu_k = 0.25$ (coefficient of friction between a felt friction member and a disc made of a phenolic resin).
$R1 = 13.5$ mm.
$R2 = 16$ mm.

The pressing force P is the sum of the weight of the tape roll acting on the upper disc, the weight of the upper disc, and the resilient force of the spring 176. Of these forces, the tape weight is approximately 70 gr., and the upper disc weight is approximately 80 gr.

Furthermore, the spring force of the spring 176 at the time of the recording/reproducing mode is set at 60 gr. Therefore, the pressing force P is as follows:

$$P = 70 + 80 + 60 = 210 \text{ gr.}$$

When the above numerical values are substituted in Eq.(1), the following solution is obtained for the torque M derived from the upper disc at the time of the recording/reproducing mode of operation.

$$M = \frac{2}{3} \times 0.25 \times 210 \times \frac{(16^3 - 13.5^3)}{(16^2 - 13.5^2)} = 776 \text{ (gr.-mm.)}$$

The actually measured torque of the upper disc at this time (in the instant example) is 675 gr.-mm.

At the time of the fast-forward mode of operation, the spring force of the spring 176 is increased to 300 gr. Then, if it is assumed that the tape roll weight and the upper disc weight are the same as those at the time of the recording/reproducing mode, the pressing force P at this time will be as follows:

$$P = 70 + 80 + 300 = 450 \text{ (gr.)}$$

When the above numerical values are substituted in Eq.(1), the torque M derived from the upper disc at the time of the fast-forward mode is obtained as follows:

$$M = \frac{2}{3} \times 0.25 \times 450 \times \frac{(16^3 - 13.5^3)}{(16^2 - 13.5^2)} = 1,663 \text{ (gr.-mm.)}$$

This torque is approximately twice that encountered at the time of the recording/reproducing mode. The torque of the upper disc 170 at this time (in the instant example) apparatus, as actually measured, is 1,485 gr.-mm.

The construction of the supply reel disc 18 is substantially the same as that of the above described take-up reel disc 19 and, therefore, will not be described.

In the reel disc device and reel disc driving device of the above described construction, it is not necessary to change the position of the drive roller. Moreover, it is not necessary to use another driving means at the time of changing over of the torque of the upper disc, that is, the reel supporting disc. For this reason, the construction can be made relatively simple.

If the tape take-up torques are substantially the same at the time of unloading and at the time of rewinding, this does not become a problem. There is no necessity of providing means for changing over the winding torque for the supply reel disc 18.

The operation of the apparatus is changed over from the recording/reproducing mode to the fast-forwarding and rewinding mode in the following manner. At the time of the recording/reproducing mode indicated in FIG. 2, the magnetic tape 14 drawn out of the cassette 10 is loaded in a relatively simple tape path, wherein it is wrapped around part of the guide drum 41, on its side facing the cassette 10. Then, as the unloading operation is carried out, and the tape 14 is no longer in contact with the drum 41, but is accommodated within the cassette 10, this tape path becomes even more simple. Accordingly, the tape 14 travels at high speed in the forward or reverse direction, without being subjected locally to an excesive tension due to a large torque applied to the reel discs which the tape is being paid out of the cassette 10.

During the recording/reproducing mode, the push button 154 is pushed for rewinding and the play push button 30 is unlocked. The push button 154 is locked in its depressed position. At this time, the operation switch $SW_2$ in the circuit illustrated in FIG. 6 is opened by the return movement of the push button 30, but it is closed again by the action of the push button 154.

As a result of the return of the push button 30, the loading mechanism of the apparatus starts to undergo the unloading operation which is similar to the operation of the push button 131 at the time of the recording/reproducing mode. Furthermore, the mechanism for controlling the tape drive assumes its state indicated in FIG. 1. A braking force is applied to the take-up reel disc 19, while a rotation in the windng direction is transmitted by way of the drive pulley 38 and the rewind roller 24 to the supply reel disc 18. As another result of the operation of the push button 154, the reel disc 19 is released from its braking force. Furthermore, the Z-shaped lever 158 is turned counterclockwise. The normal torque, at the time of rewinding, is applied to the upper disc of the supply reel disc 18, that is, to the tape roll 12.

Accordingly, at this time of unloading operation, a torque applied in the tape winding direction which is approximtely twice the torque required during an ordinary unloading operation of the tape roll 12. As a consequence, the tape 14 is drawn out of the cassette 10 from the tape roll 13. After being guided by the pair of loading poles 21 and 20, which are progressively moving toward their unoperative positions, tape again enters the cassette 10 to be taken up on the tape roll 12, and to travel at high speed in the reverse direction. That is, the apparatus accomplishes the tape rewinding operation together with the unloading operation. As this unloading operation progresses, the travel path of the tape 14 drawn out of the cassette 10 becomes more simple. The tape rewind operation is carried out smoothly.

When the pair of loading arms 78 and 87 are rotated to the position indicated in FIG. 1, and the tape 14 is completely accommodated within the cassette 10, the unloading operation is completed. The microswitch 104 is actuated by the tension lever 100, and the switch $SW_3$ (FIG. 6) is opened. However, since the push button 154 is locked in the depressed position, the switch $SW_2$ is closed. The motor 31 does not stop, but continues rotating. Accordingly, the apparatus continues the rewinding operation similarly as described above with the tape 14 in its accommodated state within the cassette 10.

During the recording/reproducing mode, the push button 160 is pressed for fast forward. It is locked in its depressed position, while the button 30 returns, as described hereinbefore. As a consequence of this depressing of the button 160, the switch $SW_2$ in the circuit shown in FIG. 6 is closed.

As a result of the return of the button 30, a braking force is applied to the take-up reel disc 19 as in when the button 131 is depressed at the time of the recording/reproducing mode. The unloading operation starts with a torque in the tape winding direction applied to the supply reel disc 18. Then, as a result of the depressing of the button 160, the drive roller 24 and the brake member 25 separate from the supply and take-up reel discs 18 and 19, respectively. This is similar to the operation at the time of the aforedescribed fast-forward control operation. The drive roller 40 is pressed against the reel disc 19. As a further result of the depressing of the button 160, the Z-shaped lever 55 is turned counterclockwise. The pressing force of the upper disc 170 (FIG. 7) against the friction member 177 increases, whereby the take-up reel disc 19 assumes a state which is suitable for the fast-forward operation.

Accordingly, at the time of unloading operation, the recording tape 14 is drawn out of the cassette 10 from the tape roll 12. After being guided by the pair of poles 20 and 21 for loading, which are moving toward their unoperative positions, tape again enters the cassette 10 to be wound on the tape roll 13 and to travel at high speed in the forward direction. That is, the tape fast-forward operation is carried out in parallel with the unloading operation. As this unloading operation progresses, the travel path of the tape 14 drawn out of the cassette 10 assumes a simpler form. The tape fast-foward operation is carried out in an even smoother manner.

When the loading arms 78 and 87 both rotate to their positions indicated in FIG. 1, and the tape 14 is completely accommodated within the cassette 10, the switch $SW_3$ in the circuit shown in FIG. 6 is opened similarly as described above. However, since the switch $SW_2$ has been closed by the locking of the button 160 in its depressed position, the motor 31 continues to run. Accordingly, the apparatus continues the fast-forward operation similarly as described hereinbefore. The tape 14 is accommodated within the cassette 10.

The apparatus in the above described rewind and fast-forward modes of operation is changed over to the stopped state (FIG. 1) by depressing the button 131, for stopping.

Accordingly, in the apparatus according to the present invention, there is no need to stop the apparatus before changing over from the recording/reproducing mode to the fast-forward and/or rewinding mode. Further, it is not necessary to wait for the completion of the unloading operation due to the stopping control manipulation. Moreover, the tape fast-forward and/or rewinding operation can be carried out simultaneously with the unloading operation. As a result, the controllability of the apparatus can be improved. Moreover, a desired fast-forward and/or rewinding operation can be carried out in a shorter time than is required in a conventional apparatus.

The paths of rotational movements of the loading poles 20 and 21 relative to the guide drum 41, at the time of loading operation, will now be described with reference to FIG. 10 and with respect particularly to the rotational locus of one loading pole 20 and the positions of the center of rotation of the loading arm 78. In FIG. 10, the point Q is on the peripheral surface of the guide drum 41 and indicates termination of the wrapping contact between the tape 14 and the guide drum 41. Since the above described apparatus is of the 2-head type, it is considered necessary for the tape 14 to be wrapped around the drum 41 over an angular extent of 180 degrees $+\alpha$. The point Q is disposed on the side of an imaginary line R opposite from that of the cassette. This line R is parallel to the front face of the cassette 10 and passes through the center O of the drum 41.

Accordingly, during the loading operation, it is necessary for the pole 20 to be moved from within the loop of the tape 14 within the cassette 10 to the operated position indicated in FIG. 10. The tape contact is a tangent $q$, relative to the drum 41 at the point Q. Furthermore, the pole 20 is set at a position approaching the point Q at the operative position.

Furthermore, the pole 20 is fixed to the loading arm 78 on the shaft 85. Shaft 85 is disposed with its center positioned at a point A. This point A is disposed on a straight line S passing through the center of the pole 20 at the loading completion position and through the center O of the drum 41. More particularly, an extension S' of the line S also lies on the line. This extension S' starts from the point O and extends away therefrom on the side opposite that of pole 20, as indicated by the solid line in FIG. 10. This point A is spaced a suitable distance away from the point O and is on the same side of the above mentioned imaginary line R as the cassette 10.

When the pole 20 is rotated about the point A during the loading and unloading operations, its path is represented by an arc $a$. The curvature of this arc $a$ is the same as that of the peripheral surface of the guide drum 41 adjacent the arc $a$. Moreoever, the spacing distance L between the pole 20 and the peripheral surface of the drum 41 is of a maximum value $L_1$ in the unloadng completion state. Distance progressively decreases through values $L_2, L_3, \ldots L_6$ as the loading operation progresses, until it reaches a minimum value $L_7$ at the loading completion position.

Therefore, in the loading operation, the pole 20 rotates in a manner which gradually approaches the peripheral surface of the drum 41. Pole 20 is restricted from further rotation at a position nearest the drum, at the time of completion of loading. Accordingly, there is no necessity for providing means for preventing abutting of the pole 20 against the drum 41, during the loading and unloading operations. Furthermore, since there is a relatively short distance from the pole 20 to the above mentioned point Q at the time of recording/reproducing, the travel of the tape along the drum 41 is effected with stability. Excellent pictures can be reproduced without defects, such as jitter.

Another advantageous feature of the invention is that, since the distance of movement of the pole 20 and the rotational angle of the loading arm 78 at the time of the loading operation are relatively small, the length of the tape drawn out of the cassette 10 can be made short. Moreover, the entire apparatus can be miniaturized. Furthermore, the loading operation can be carried out in a relatively short time (about 2 seconds). In addition, there is a short spacing distance between the loading poles 20 and 21 when the two poles are both disposed within the cassette 10. The exposed part of the tape 14 becomes short at the front face of the cassette 10. The possibility of accidents during handling of the cassette, such as pulling the tape from the cassette, is reduced. An attendant advantage is that the window opening (not shown) at the front face of the cassette 10 can be reduced in size.

The rotation axis 85 of the loading arm 78 need not be positioned exactly on the above mentioned straight-line extension S', but may be disposed in the vicinity of this line S'.

When the center of rotation of the loading arm 78 departs from the straight-line extension S' and is set at points B, C, D, E, and F, for example, on the side of the cassette 10, the pole 20 is moved along corresonding rotational paths $b, c, d, e$, and $f$. In this case, the pole 20, in its unoperative position, is disposed within the cassette 10 at a position spaced apart from the drum 41. It is necessary to provide an undesirably large opening at the front face of the cassette. On the other hand, when the center of rotation of the loading arm 78 is set at a point separated from the extension S' on the side opposite from the cassette, for example, at points H and I, the pole 20 is moved along rotational paths $h$ and $i$, respectively, and reaches its operational positions contacting the tangent $q$. In this case, the pole 20 approaches the drum most closely during the loading operation. At the loading completion position pole 20 reaches a position which is relatively separated apart from the point Q. Consequently, the travel at the time of recording/reproducing becomes unstable, and jitter readily occurs.

Furthermore, when the center of rotation of the loading arm is set at the center O of the drum and a point G in the neighborhood of this center, the pole moves along rotational paths $o$ and $g$, respectively. In this case, the center of rotation of the arm is provided in the neighborhood of the rotating shaft of a rotating head. The construction becomes complicated. Furthermore, there is a large rotational angle of the arm at the times of loading and unloading operations, miniaturization of the apparatus becomes difficult, and a relatively long time is required for loading. Another disadvantage is that a relatively large driving power is required for rotating the arm.

A device for guiding the tape 14, as it is wrapped in contact with the guide drum 41, will now be described, with reference to FIGS. 11 through 14. The guide drum 41 has upper and lower drums 41a and 41b, which are held with a slight spacing therebetween by the support structure 42. Drum 41 is mounted with an inclination as described before relative to the sub-chassis 44. Mounting is carried out by means of a support structure 190 of cylindrical shape, having an inner diameter which is slightly greater than the diameter of the lower drum 41b. A plate-form tape guide 191 of triangular shape, in a developed or flattened state, is so mounted as to abut at its lower edge against the support structure 190, and to be wrapped around the lower drum 41b. The oblique side of this tape guide assumes a helical shape relative to the drum 41. Furthermore, this tape guide 191 is provided with a known fine adjustment mechanism.

In addition, resilient guide members 192a and 192b are formed by bending a thin sheet material possessing flexibility (such as phosphor bronze or a polyethylene terephthalate) which has curved abutting parts 193a and 193b. These elastic guide members 192a and 192b are fitted respectively into cutout recesses 194a and 194b formed in the upper drum 41a and are secured by screws 195a and 195b as shown in FIGS. 11, 12, and 13.

The abutting parts 193a and 193b project from the peripheral surface of the drum in a manner to face the upper end face of the tape guide 101. The spacing distance between the tape guide surface 196 of the tape guide 191 and the abutting parts 193a and 193b is set at a distance $l$ which is slightly less than the width of the recording tape 14. Furthermore, the abutting parts 193a and 193b are so formed that they will not interfere with the action of the tape 14 wrapped around the drum 41 and will not damage the tape 14 during its travel.

Accordingly, the recording tape 14 travels along its prescribed path, as it wraps around the guide drum 41, over a specific region thereof, determined by the pair of poles 20 and 21 for loading. The tape 14 is engaged at its upper edge by the abutting parts 193a and 193b of the elastic guide members 192a and 192b. It is subjected to a slight downward displacement force and travels with its lower edge in positive contact with the tape guide surface 196 of the tape guide 191. Accordingly, the tape 14 travels along the correct travel path, being prevented from changing position in its width direction even if an external disturbance arises. The scanning by the rotating magnetic head (not shown) of the magnetic tape 14 is always accomplished accurately and positively.

In another embodiment of the tape guide device as illustrated in FIG. 14, screw 199 secures an elastic guide member 197 to the upper drum 41a, in a state wherein it is fitted in a cutout recess 198 in the upper drum similarly as in the preceding embodiment. The guide member 197 is provided at its end with an abutting part 200 of curved shape. This abutting part 200 is engaged at its lower edge by a tape guide (not shown). Part 200 comprises a first guide part 201 for engaging the upper edge of the tape 14 as it makes its wrapping contact with the drum 41. A second guide part 202 engages and guides the upper edge of the tape 14 in the final stage of the loading operation, as indicated by a two-dot chain line thereby to cause the tape to wrap around part of the peripheral surface of the drum, over a specific range thereof.

Further, this invention is not limited to these embodiments but variations and modifications may be made without departing from the scope and spirit of the invention.

What is claimed:

1. An automatic tape loading type recording and/or reproducing apparatus comprising: a cylindrical tape guide structure means having at least one transducer such as a rotating head; tape drawing and guiding means for drawing a tape-shaped recording medium out of a tape accommodating casing structure and for wrapping said tape in contact with a specific arcuate section of said cylindrical tape guide structure; a single driving power source means such as a motor; a rotating body driven in rotation by said driving power source means; an eccentric rotating structure having a center of eccentric rotation and a circular periphery, the radial distance between the periphery and the center of rotation varying gradually and proportionally between a minimum and a maximum according to the angular positions thereof, said rotating structure pressing said periphery against said rotating body and being driven in eccentric rotation responsive to power transmitted thereto from said rotating body, said eccentric rotating structure displacing the center of eccentric rotation with respect to said rotating body according to the rotational angular position thereof; means for transmitting the displacement of the center of eccentric rotation to said tape drawing and guiding means, said transmitting means operating responsive to the displacement of said center of eccentric rotation in one direction as a result of an initial one half revolution of said eccentric rotating structure for causing said tape drawing and guiding means to draw said recording medium from said tape accommodating casing structure and to cause the same to be brought into contact with said cylindrical tape guide structure, and said transmitting means operating responsive to the displacement of said center of eccentric rotation in an opposite direction responsive to the succeeding one half revolution of said eccentric rotating structure for causing said tape drawing and guiding means to separate said recording medium from the tape guide structure and to return the same to be accommodated within said casing structure; and operating means for moving said center of eccentric rotation back and forth in opposite directions at the end position in one direction, said operating means holding said eccentric rotating structure in a position where it no longer presses against said rotating body thereby ending the transmission of rotational power from said rotating body to said eccentric rotating structure.

2. An automatic tape loading type recording and/or reproducing apparatus according to claim 1 which further comprises means accommodating a tape-shaped structure for operating supply and/or take-up reel discs or disc with rotation in the direction for winding the tape-shaped structure, said loading operating being carried out by said tape drawing and guiding means as a result of the initial one half revolution of said eccentric rotating body responsive to the urging of said driving power source, said unloading operation being carried out by the movement of the tape drawing and guiding means to the original position thereof responsive to the succeeding one half revolution of the eccentric rotating body.

3. An automatic tape loading type recording and/or reproducing apparatus according to claim 1 in which said transmitting means comprises a pair of moving means, and each of said pair of moving means comprising a first lever rotatably supported at one end thereof, a second lever rotatably supported at one of its ends on the other end of said first lever and disposed in a non-aligned state relatively to the first lever, a rotatable loading arm coupled at one of its ends to the other end of said second lever, said rotatable loading arm having at its other end said tape drawing and guiding means, and rotating means for increasing and decreasing the angle between said first and second levers at the pin connection therebetween and for rotating said loading arm in one rotational direction or in the opposite direction, said rotating means operating at the time of a tape loading mode to rotate the pair of loading arms in clockwise and counterclockwise directions respectively and at the time of a tape unloading mode to rotate said pair of loading arms in counterclockwise and clockwise directions respectively.

4. An automatic tape loading type recording and/or reproducing apparatus according to claim 1 which further comprises means for accommodating a tape structure for operating supply and/or take-up reel discs or disc with rotation in the direction for winding the tape-shaped structure, said accommodating means operating when said tape drawing and guiding means move responsive to the displacement of said center of eccentric rotation in the opposite direction.

5. An automatic tape loading type recording and/or reproducing apparatus according to claim 1 which further comprises pinch roller actuating means holding a pinch roller and operated interrelatedly with loading and unloading operations due to said tape drawing and guiding means by an operation of said transmitting means to press said pinch roller against said capstan with said tape-shaped recording medium interposed therebetween and to separate the pinch roller away from the capstan.

6. An automatic tape loading type recording and/or reproducing apparatus according to claim 1 which further comprises reel disc means for receiving and supporting said tape, means for applying a braking force to said reel disc, tension servo means for detecting the tape tension of said tape-shaped body drawn out of said tape accommodating casing structure and for adjusting said braking force applied to a reel disc in response to said detection, and change-over means operating interrelatedly with movement of said tape drawing and guiding means toward the operational position thereof to change over said tension servo means progressively to the operating state thereof.

7. An automatic tape loading type recording and/or reproducing apparatus according to claim 1 which further comprises electric power supply circuit means comprising first switch means for delivering electric power of said driving power source means, means for operating said first switch means to a closed position responsive to at least a playing control manipulation and to an opened position by a stopping control manipulation, and second switch means connected in parallel with said first switch means and operating to detect the state of said tape-shaped structure when it is drawn out of said tape accommodating casing structure, means for operating said second switch means to a closed position when said tape is drawn out and to an open position when said tape is within said casing structure; said electric power supply circuit being closed by said second switch means responsive to a stopping control manipulation during the recording/reproducing mode, even when said first switch means is opened.

8. An automatic tape loading type recording and/or reproducing apparatus according to claim 1 which further comprises a reel disc, a rotating body means for selectively pressing against or separating from said reel disc, means for causing said rotating body to press against said reel disc at the time of stopping mode, unloading mode, and means responsive to high-speed travel in one direction of said tape-shaped structure for separating said rotating body from the reel disc at the time of at least the loading mode, and rotation transmitting means for transmitting rotation from said driving power source to said rotating body, and means whereby said rotating body imparts a torque in the tape winding direction to the reel disc at the time of high-speed driving and travel of the tape-shaped structure and at the time of the unloading mode and imparts a braking force against the reel disc by the rotational loading torque of the rotation transmitting means at the time of the stopping mode wherein the driving power source is in the unoperated state.

9. An automatic tape loading type recording and/or reproducing apparatus according to claim 1 in which said tape drawing and guiding means comprises a pair of tape drawing and guiding members moving from the interior of said tape accommodating casing structure to the two sides of said cylindrical guide structure, said pair of members being positioned to face said casing structure, high-speed tape driving means for driving said tape-shaped structure in high-speed travel, rewinding and/or fast-forwarding control means operated by control manipulation at the time of the recording/reproducing mode to cause both of said pair of tape drawing and guiding members to move toward unoperated positions thereof and, at the same time, to change over said high-speed tape driving means to the operative state thereof, means for operating said high-speed tape driving means together with the unloading operation due to the drawing means as a result of control manipulation of said rewinding and/or fast-forwarding control means at the time of recording/reproducing mode to start high-speed travel of said tape-shaped structure.

10. An automatic tape loading type recording and/or reproducing apparatus according to claim 1 in which said tape drawing and guiding means comprises a pair of pole members operating to pass on opposite sides of said cylindrical tape guide structure and to move to positions close to said tape guide structure thereby to cause said tape-shaped structure, in a loading completion position, to wrappingly contact said cylindrical tape guide structure over a peripheral range thereof corresponding to at least 180° of angle, a pair of rotating arm members for supporting said pole members, and each of the centers of rotation respectively of said rotating arm members being disposed at or near a position on an imaginary straight line passing through the centers of the corresponding pole member in a loading completion position and of said tape guide structure, said position being at a suitable distance spaced away from said center of the tape guide structure in the direction opposite to that of said pole member.

11. An automatic tape loading type recording and/or reproducing apparatus according to claim 1 which further comprises engagement means for engaging said tape drawing and guiding means at the loading completion position thereof, to prevent further movement thereof in the direction of the loading operation, and force applying means for applying further a displacement force in the direction of the loading operation to said tape drawing and guiding means in the state of loading completion, said force applying means, in the state of loading completion, actively pressing said tape drawing and guiding means against said engagement means.

12. An automatic tape loading type recording and/or reproducing apparatus according to claim 11 in which said engagement means comprises first and second engagement members simultaneously engaging said tape drawing and guiding means engaging said tape-shaped structure at the outer sides of the two lateral edges along the longitudinal direction of said tape-shaped structure.

13. An automatic tape loading type recording and/or reproducing apparatus comprising: cassette housing means for accommodating a cassette which includes first and second reels having a tape recording medium wound on and extending between the reels; reel disc means for rotatably supporting the first and second reels in the cassette accommodated in said cassette housing means; cylindrical tape guide structure means having at least one transducer such as a rotating head; a pair of rotatable arm members respectively having a pole member at one end thereof; means for supporting said pair of rotatable arm members for rotation between first and second positions in such a manner that the respective pole members move into the interior of the cassette at the first positions of said rotatable arm members and move to the two sides of said cylindrical tape guide structure at the second positions, said pole members drawing the tape recording medium extending between the first and second reels out of the cassette and wrapping said tape in contact with a specific arcuate section of said cylindrical tape guide structure responsive to the movement of the rotatable arm members from the first positions to the second positions, said pole members separating said tape recording medium from said cylindrical tape guide structure and returning it within the cassette as the rotatable arm members move from the second positions to the first positions; single rotating unidirectional driving power souce means; a rotating body driven in rotation by said driving power source means; rotatably disposed lever means; said lever means rotatably and eccentrically supporting a roller at one end thereof; urging means for pressing the roller against said rotating body so that the roller is driven in rotation by power transmitted thereto from said rotating body and said lever means swinging about the center of its rotation; and transmitting means responsive to the swing of said lever means during an initial one half revolution of the roller for moving said pair of rotatable arm members from the first positions to the second positions and responsive to the swing of said lever means during a succeeding one half revolution of the roller for moving said pair of rotatable arm members from the second positions to the first positions.

14. An automatic tape loading type recording and/or reproducing apparatus according to claim 13 and capstan means, means for causing said rotating body to rotate unitarily with said capstan means responsive to power from said driving power source means.

15. An automatic tape loading type recording and/or reproducing apparatus according to claim 14 which further comprises a pinch roller, pinch roller actuating means holding said pinch roller and operated interrelatedly with loading and unloading operations responsive to an operation of said transmitting means to press or separate said pinch roller against or away from said capstan with said tape recording means interposed therebetween.

16. An automatic tape loading type recording and/or reproducing apparatus according to claim 13 which further comprises means operated upon the completion of loading and unloading for engaging and holding said roller against said urging means in a position where said roller no longer presses against said rotating body thereby ending the transmission of rotational power from the rotating body through the roller to said lever means.

17. An automatic tape loading type recording and/or reproducing apparatus according to claim 13 in which said transmitting means comprises a pair of moving means, and each of said pair of moving means comprising a first lever rotatably supported at one end thereof, a second lever rotatably supported at one of its ends on the other end of said first lever and angularly disposed in a nonaligned state relative to the first lever, said rotatable arm member being coupled at the other end thereof to the other end of said second lever, and rotating means for increasing and decreasing the angle between said first and second levers and for rotating said rotatable arm member in either of two opposite directions, said rotating means operating during tape loading to rotate the pair of rotatable arm members in clockwise and counterclockwise directions respectively and during tape unloading to rotate said pair of rotatable arm members in counterclockwise and clockwise directions respectively.

18. An automatic tape loading type recording and/or reproducing apparatus according to claim 13 which further comprises means for applying a braking force to said reel disc means, tension servo means for detecting the tension of said tape recording medium drawn out of said cassette and for adjusting said braking force applied to a reel disc in response to said detection, change-over means operating interrelatedly with movement of said rotatable arm members toward the second positions to progressively change over said tension servo means to the operating state thereof.

19. An automatic tape loading type recording and/or reproducing apparatus according to claim 13 which further comprises electric power supply circuit means comprising first switch means for delivering electric power to said driving power source means, means for operating said first switch means to a closed position responsive to at least a playing control manipulation and to an opened position responsive to a stopping control manipulation, and second switch means connected in parallel with said first switch means and operating to detect the state of said tape recording medium when it is drawn out of said cassette, means for operating said switch to a closed position when said tape is drawn out and to an open position when said tape is within said cassette; said electric power supply circuit being closed by said second switch means responsive to a stopping control manipulation during the recording/reproducing mode, even when said first switch means is opened.

20. An automatic tape loading type recording and/or reproducing apparatus according to claim 13 which further comprises rotating body means for selectively pressing against or separating from said reel disc means, means for causing said rotating body means to press against said reel disc means when said apparatus is in a stopping mode or unloading mode, and means responsive to high-speed travel in one direction of said tape recording medium for separating said rotating body means from the reel disc means at the time of at least the loading mode, and rotation transmitting means for transmitting rotation from said driving power source means to said rotating body means, and means whereby said rotating body means imparts a torque in the tape winding direction to the reel disc means during high-speed driving and travel of the tape recording medium and during the unloading mode and imparts a braking force against the reel disc means by the rotational loading torque of the rotation transmitting means during the stopping mode wherein the driving power source means is in the unoperated state.

21. An automatic tape loading type recording and/or reproducing apparatus according to claim 13 in which said rotatable arm member disposing means disposes the rotatable arm members such that said pair of pole members pass on opposite sides of said cylindrical tape guide structure and move to positions close to said tape guide structure thereby to cause said tape recording medium, when in a loading completion position, to wrappingly contact said cylindrical tape guide structure over a peripheral range thereof corresponding to at least an angle of 180°, and each of the centers of rotation respectively of said rotatable arm members being disposed at or near a position on an imaginary straight line passing through the centers of the corresponding pole member when in a loading completion position and of said tape guide structure, said position being at a suitable distance spaced away from said center of the tape guide structure in the direction opposite to that of said pole member.

22. An automatic tape loading type recording and/or reproducing apparatus according to claim 13 which further comprises engagement means for engaging said rotatable arm members at the second position, to prevent further movement thereof in the direction of the loading operation, and force applying means for further applying a displacement force in the direction of the loading operation to said rotatable arm members in the state of loading completion, actively pressing said rotatable arm members against said engagement means.

* * * * *